United States Patent Office

3,605,892
Patented Sept. 20, 1971

3,605,892
IMPARTING IN SITU STABILITY TO DISPLACING FLUIDS
William B. Gogarty and Richard W. McAtee, Littleton, Colo., assignors to Marathon Oil Company, Findlay, Ohio
No Drawing. Filed Oct. 29, 1969, Ser. No. 872,348
Int. Cl. E21b 43/22
U.S. Cl. 166—273
24 Claims

ABSTRACT OF THE DISCLOSURE

An improved process of recovering hydrocarbon from a hydrocarbon-bearing subterranean fomation having at least one injection means in fluid communication with at least one production means and wherein a flooding agent (e.g. a miscible-type) is injected into the formation followed by the injection of a displacing fluid containing a mobility reducing agent and the displacing fluid followed by a drive fluid to displace the flooding agent and displacing fluid toward the production means to recover crude oil therethrough, the improvement comprising incorporating into a mini-slug of the displacing fluid relatively high concentrations of the mobility reducing agent. For example, 1–20 percent formation pore volume of a micellar dispersion is followed by 0.1–20% formation pore volume of a displacing fluid containing 50–100,000 p.p.m. of the mobility reducing agent and this, in turn, followed by drive water.

BACKGROUND OF THE INVENTION

U.S. 3,039,529 to McKennon teaches that from about 100 to about 5,000 p.p.m. of a high molecular weight partially hydrolyzed polyacrylamide is useful to improve a waterflooding process for recovering crude oil from a subterranean formation.

U.S. 2,771,138 to Beeson teaches a waterflooding method wherein viscosity reducing agents such as naturally occurring gums and polymers, aqueous solutions containing synthetic polymers (such as copolymers of methyl vinyl ether and maleic anhydride, the condensation products of fatty acids and hydroxy amines, sodium polyacrylate, polyacrylate acid, sodium polymethacrylate, etc.), surcrose and crude sugar, etc. are useful to recover crude oil from subterranean formations.

The prior art generally teaches that the front portion of a waterflood desirably contains a viscosity increasing agent to obtain favorable flooding condition. That is, a more favorable viscosity condition is obtained which results in less fingering and improved oil recovery in the waterflooding process. The prior art preferably teaches that the front portion of the waterflood has a viscosity which is equal to or slightly greater than the viscosity of the crude oil or formation fluids and that subsequent portions of the waterflood have viscosities graded incrementally to a low viscosity of that of a subsequent water drive (i.e. water absent the viscosity increasing agent). Such a gradual grading of the viscosity imparting agent results in a waterflooding process having a favorable flooding condition, i.e. such protects against fingering of the drive water into the formation fluids. However, with such a gradual grading of the viscosity, a relatively large surface energy is required to displace the flooding components through the formation.

The prior art also teaches that flooding agents such as miscible flooding agents and miscible-like flooding agents, etc., followed by displacing fluids (having preferably graded viscosities) and this in turn followed by a drive fluid is very efficient to recover crude oil from a subterranean formation. The prior art teaches that the displacing fluid can have a high viscosity at its front portion and the viscosity can be graded gradually back to a low viscosity of the drive fluid. Such a grading effect, teaches the prior art, gives a very stable flooding condition to the recovery process. Again, large surface energies are required to effect the flooding process.

SUMMARY OF THE INVENTION

Applicants have discovered that improved oil recoveries can be obtained in a flooding process by displacing the flooding agent with a mini-slug of a displacing fluid containing relatively large amounts of the mobility reducing agent and this, in turn, followed by a drive fluid to displace the flooding agent and displacing fluid toward a production means in fluid communication with the formation. By concentrating large amounts of the mobility reducing agent into a small volume of the displacing fluid, improved oil recoveries are realized—this is contrary to what the prior art teaches. That is, the prior art teaches that adverse mobility condition would be characteristic of such a flooding process in that the drive fluid would tend to readily finger through the viscous small volume of displacing fluid. Also, applicants' invention requires less surface energy to effect the flood as compared to similar prior art flooding.

DESCRIPTION OF THE INVENTION

Flooding agents useful with this invention include any liquid or gaseous flooding agent which will effectively displace hydrocarbon from a subterranean formation. The flooding agent can be miscible agent, a miscible-like agent, or any agent which tends to miscibilize or solubilize fluids within the formation. Examples of flooding agents include micellar dispersions (both water-external and oil-external); emulsions including both oil-external and water-external; hydrocarbon flooding agents containing alcohols or other similar semi-polar organic compounds, aqueous systems containing surfactants and/or semi-polar organic compounds, hydrocarbon or substantially hydrocarbon flooding agents containing surfactants and/or semi-polar organic compounds, or semipolar organic slugs (e.g. alcohol, aldehydes) or agents which are substantially semi-polar organic slugs, etc. Examples or useful flooding agents include those defined in U.S. 3,254,714 to Gogarty et al.; U.S. 3,307,628 to Sena; U.S. 3,356,138 to Davis et al.; U.S. 3,376,925 to Coppel; U.S. 3,406,754 to Gogarty; U.S. 3,348,611 and U.S. 3,330,343 to Reisberg; U.S. 3,354,953 to Morse; U.S. 3,373,809 and 3,446,282 to Cooke, Jr. et al.; etc. Preferably, the flooding agent is a micellar dispersion.

Generally from about 1% to about 20% or more of the flooding agent is injected into the formation. A larger pore volume of the flooding agent can be injected, however, economics of the process may dictate smaller amounts. A pre-slug to the flooding agent can also be used with this invention, the pre-slug conditions the formation so that the formation and/or displacing fluid may be more compatible with the characteristics of the formation being flooded, e.g. ions within the interstitial water.

The flooding agent can have a mobility about equal to or less than about that of the formation fluids flowing ahead of the flooding agent in the formation. The term "formation fluids" includes both interstitial water and hydrocarbon within the formation. Such a mobility design is desired to give a more stable flooding characteristic. In addition, the back portion of the flooding agent may have a relatively higher mobility than the front portion of the flooding agent, e.g. the mobilities can be graded from a low to a high.

The flooding agent is followed by displacing fluid. One of the purposes of the displacing fluid is to act as a mobility buffer between the flooding agent and a subsequent drive fluid. That is, the displacing fluid protects the flooding agent from drive water fingering into and through the flooding agent. Also, a more efficient flooding process is obtained with the displacing fluid acting as a mobility buffer. The displacing fluid contains sufficient mobility reducing agent to substantially reduce the mobility of the displacing fluid flowing in the subterranean formation. Generally, such a mobility reducing agent increases the viscosity of the displacing fluid and/or possibly decreases the permeability of the reservoir rock to the flow of the displacing fluid and drive fluid.

The displacing fluid can be substantially hydrocarbon or substantially aqueous. The type will depend on the particular flooding agent used. Also, the displacing fluid preferably contains a mobility reducing agent. Examples of mobility reducing agents include any agent which is compatible with the majority of components in the displacing fluid and which will effectively decrease the mobility of the displacing fluid flowing through the formation. This is obtained, for example, by increasing the viscosity of the displacing fluid and/or reducing the permeability of the reservoir rock to the flow of the particular displacing fluid through the formation rock. A substantially aqueous displacing fluid containing a high molecular weight organic polymer such as a partially hydrolyzed, high molecular weight polyacrylamide, polysaccharide, and certain anionic polymers (especially those that are not sensitive to salts in the formation), are especially useful when the flooding agent is a micellar dispersion. Nonionic polymers such as polyisobutylene, etc. are useful with substantially hydrocarbon displacing fluids.

From about 0.1 percent to about 20 percent formation pore volume or more of the displacing fluid and more preferably from about 1 percent to about 5 percent are useful as a mini-slug of the displacing fluid with this invention. The mini-slug contains a relatively high concentration of the mobility reducing agent. The actual amount will depend on the particular flooding agent. Generally from about 50 to about 100,000 p.p.m. or more of a mobility reducing agent is useful in the displacing fluid. When the displacing fluid is substantially aqueous, from about 200 to about 5000 p.p.m. of a high molecular weight partially hydrolyzed polyacrylamide is effective to improve oil recovery. In addition, the displacing fluid can contain other additives compatible with the process, e.g. bactericides, corrosion and scale inhibitors, etc.

The displacing fluid is followed by a drive fluid which can be hydrocarbon or aqueous. The type of drive fluid will depend on whether the displacing fluid is substantially hydrocarbon or substantially aqueous. The drive fluid is preferably aqueous when the flooding agent is a micellar dispersion and the displacing fluid is substantially aqueous. The drive fluid displaces the flooding agent and the displacing fluid through the formation toward a production means to recover crude oil through the production means. The drive fluid can contain additives such as bactericides, corrosion and scale inhibitors, etc. to obtain desired characteristics with the flooding process.

By practicing this invention, an earlier return on invested money can be realized. That is, increased injectivity as well as lower ΔP flooding conditions and less required surface energy is realized with the teachings of this invention.

The following example teaches specific embodiments of the invention. This example is not intended to limit the invention in any way; rather, all equivalents known or obvious to those skilled in the art are intended to be equated within the scope of the invention as defined within the specification and appended claims. Unless otherwise specified, the percents are based on volume.

Example I

Fired Berea sandstone cores four feet long by three inches in diameter having characteristics indicated in Table 1 are treated as follows:

(1) saturated with water containing about 18,000 p.p.m. of total dissolved solids,
(2) flooded to irreducible water saturation with crude oil obtained from the Henry lease in Illinois (hereinafter identified as Henry crude oil and having a viscosity of about 5.9 at 72° F.), and
(3) then waterflooded to residual oil saturation with water obtained from the Henry lease in Illinois (hereinafter identified as Henry plant water, contains about 17,000 p.p.m. of total dissolved solids).

The cores were then flooded with 2% pore volume of a micellar dispersion containing 49% water (contains 400 p.p.m. of total dissolved salts), 8.0% ammonium petroleum sulfonate, 41.1% hydrocarbon, 0.13% isopropyl alcohol, and 2.36% primary amyl alcohol. After the micellar dispersions are injected into the cores, there is injected one pore volume of an aqueous displacing fluid wherein the front 10% and the back 90.0% of the displacing fluid has the composition indicated in Table 1 (the polymer used in the displacing fluid is No. 730 Pusher, a high molecular weight partially hydrolyzed polyacrylamide sold by Dow Chemical Company). Water within the displacing fluid contains about 400 p.p.m. of total dissolved salts. Where the back 90% of the displacing fluid contains 0% polymer, this portion is identical with the drive fluid of this invention. The total hydrocarbon recovered from the cores is indicated in Table 1:

TABLE 1.—EFFECT OF POLYMER CONCENTRATION ON OIL RECOVERY

| Sample No. | Polymer concentration, p.p.m. First 10% pore volume | Polymer concentration, p.p.m. Next 90% pore volume | Total polymer injected [1] | Total hydrocarbon recovered, percent | Core characteristics Initial oil saturation, percent | Core characteristics Average permeability (to air) md. |
|---|---|---|---|---|---|---|
| A | 1,200 | 0 | 120 | 51.9 | 34.7 | 679 |
| B-1 | 200 | 200 | 200 | 56.4 | 33.1 | 786 |
| B-2 | 2,000 | 0 | 200 | 73.9 | 33.4 | 661 |
| C-1 | 300 | 300 | 300 | 64.6 | 33.2 | 799 |
| C-2 | 3,000 | 0 | 300 | 86.0 | | |
| D | 700 | 400 | 430 | 79.4 | 33.8 | 670 |
| E | 2,000 | 400 | 560 | 89.4 | 35.1 | 701 |
| F | 700 | 700 | 700 | 88.5 | 37.4 | 435 |
| G | 1,200 | 700 | 750 | 93.4 | 37.3 | 318 |

[1] Σ pore volume fraction×polymer concentration.
NOTE.—With runs containing the same amount of polymer, recovery is much better with a mini-slug of the displacing fluid containing the polymer.

What is claimed is:

1. In a process of recovering hydrocarbon from a hydrocarbon-bearing subterranean formation having at least one injection means in fluid communication with at least one production means and wherein a flooding agent is injected into the formation followed by the injection of a displacing fluid containing a mobility reducing agent and the displacing fluid followed by a drive fluid to displace the flooding agent and displacing fluid toward the production means to recover hydrocarbon through said production means, the improvement comprising incorporating up to about 10% formation pore volume of the displacing fluid relatively high concentrations of the mobility reducing agent.

2. The process of claim 1 wherein the flooding agent is a micellar dispersion.

3. The process of claim 2 wherein from about 1 to about 20 percent formation pore volume of the micellar dispersion is injected into the formation.

4. The process of claim 1 wherein the displacing fluid is substantially aqueous.

5. The process of claim 4 wherein the mobility reducing agent is a partially hydrolyzed, high molecular weight polyacrylamide.

6. The process of claim 4 wherein the mobility reducing agent is a polysaccharide.

7. The process of claim 4 wherein the mobility reducing agent is an anionic polymer.

8. The process of claim 1 wherein the displacing fluid is substantially hydrocarbon.

9. The process of claim 8 wherein the mobility reducing agent is a nonionic polymer.

10. The process of claim 1 wherein from about 0.1 to about 10 percent formation pore volume of the displacing fluid is injected into the formation.

11. The process of claim 1 wherein the displacing fluid contains from about 50 to about 100,000 parts per million of the mobility reducing agent.

12. The process of claim 1 wherein the drive fluid is an aqueous medium.

13. The process of claim 1 wherein the drive fluid is hydrocarbon.

14. A process of recovering hydrocarbon from a hydrocarbon-bearing subterranean formation having at least one injection means in fluid communication with at least one production means and wherein from about 1 to about 20 percent formation pore volume of a micellar dispersion is injected into the formation followed by the injection of an aqueous medium containing a mobility reducing agent and this, in turn, followed by an aqueous drive fluid to displace the micellar dispersion and aqueous displacing fluid toward the production means to recover crude oil therethrough, the improvement comprising incorporating at least about 600 p.p.m. of the mobility reducing agent into up to about 10% pore volume of the aqueous displacing fluid.

15. The process of claim 14 wherein from about 0.1 to about 10% formation pore volume of the aqueous displacing fluid is injected into the formation.

16. The process of claim 14 wherein the aqueous displacing fluid contains from about 700 to about 100,000 parts per million of the mobility reducing agent.

17. The process of claim 14 wherein the mobility reducing agent is a partially hydrolyzed, high molecular weight polyacrylamide.

18. The process of claim 14 wherein the mobility reducing agent is a polysaccharide.

19. The process of claim 14 wherein the mobility reducing agent is an anionic polymer.

20. The process of claim 14 wherein the micellar dispersion is comprised of hydrocarbon, surfactant, and aqueous medium.

21. In a process of recovering hydrocarbon from a hydrocarbon-bearing subterranean formation having at least one injection means in fluid communication with at least one production means and wherein a flooding agent is injected into the formation followed by the injection of a displacing fluid containing a mobility reducing agent and the displacing fluid followed by a drive fluid to displace the flooding agent and displacing fluid toward the production means to recover hydrocarbon through said production means, the improvement comprising incorporating into up to about 10% formation pore volume of the displacing fluid at least about 1200 p.p.m. of the mobility reducing agent.

22. The process of claim 21 wherein the flooding agent is a micellar dispersion.

23. The process of claim 21 wherein the displacing fluid is substantially aqueous.

24. The process of claim 21 wherein the mobility reducing agent is a partially hydrolyzed, high molecular weight polyacrylamide.

References Cited

UNITED STATES PATENTS

| | | | |
|---|---|---|---|
| 2,988,142 | 6/1961 | Maly | 166—273 |
| 3,261,399 | 7/1966 | Coppel | 166—273 |
| 3,429,372 | 2/1969 | Connally, Jr. | 166—273X |
| 3,482,631 | 12/1969 | Jones | 166—273 |
| 3,500,918 | 3/1970 | Holm | 166—273 |
| 3,500,924 | 3/1970 | Poettmann | 166—273X |
| 3,512,586 | 5/1970 | Holm | 166—273 |

STEPHEN J. NOVOSAD, Primary Examiner

UNITED STATES PATENT OFFICE
CERTIFICATE OF CORRECTION

Patent No. 3,605,892   Dated Sept. 20, 1971

Inventor(s)  W. B. Gogarty et al

It is certified that error appears in the above-identified patent and that said Letters Patent are hereby corrected as shown below:

Col. 1, line 14:   Delete "fomation" and insert --formation--.

Col. 1, line 45:   Delete "polyacrylate" and insert --polyacrylic--.

Col. 1, line 46:   Delete "surcrose" and insert --sucrose--.

Col. 2, line 44:   Delete "or" and insert --of--.

Signed and sealed this 7th day of March 1972.

(SEAL)
Attest:

EDWARD M. FLETCHER, JR.
Attesting Officer

ROBERT GOTTSCHALK
Commissioner of Patents

UNITED STATES PATENT AND TRADEMARK OFFICE
CERTIFICATE OF CORRECTION

PATENT NO. : 3,605,892
DATED : September 20, 1971
INVENTOR(S) : William B. Gogarty et al It is certified that error appears in the above-identified patent and that said Letters Patent are hereby corrected as shown below:

Col. 4, line 73:   Insert --in-- after "incorporating".

Signed and Sealed this

Thirteenth Day of October 1981

[SEAL]

Attest:

GERALD J. MOSSINGHOFF

Attesting Officer    Commissioner of Patents and Trademarks